US012596740B2

(12) United States Patent
Kaul et al.

(10) Patent No.: US 12,596,740 B2
(45) Date of Patent: Apr. 7, 2026

(54) INFERRING RIGHT LEAF-CATEGORY FOR A PRODUCT USING LLM

(71) Applicant: eBay Inc., San Jose, CA (US)

(72) Inventors: Sudhir Kaul, San Jose, CA (US);
Animesh Kumar, San Jose, CA (US);
Raunak Raheja, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 18/775,877

(22) Filed: Jul. 17, 2024

(65) Prior Publication Data

US 2025/0328575 A1 Oct. 23, 2025

Related U.S. Application Data

(60) Provisional application No. 63/635,957, filed on Apr. 18, 2024.

(51) Int. Cl.
| | |
|---|---|
| *G06F 16/355* | (2025.01) |
| *G06F 40/205* | (2020.01) |
| *G06F 40/284* | (2020.01) |

(52) U.S. Cl.
CPC .......... *G06F 16/355* (2019.01); *G06F 40/205* (2020.01); *G06F 40/284* (2020.01)

(58) Field of Classification Search
CPC ..... G06F 16/355; G06F 40/284; G06F 40/205
See application file for complete search history.

(56) References Cited

U.S. PATENT DOCUMENTS

| | | | |
|---|---|---|---|
| 6,233,575 B1 | 5/2001 | Agrawal et al. | |
| 6,990,485 B2 | 1/2006 | Forman et al. | |
| 11,321,580 B1* | 5/2022 | Walczak | G06N 3/045 |
| 11,481,602 B2 | 10/2022 | Ramani et al. | |
| 11,625,555 B1* | 4/2023 | Zhiyanov | G06F 18/24 |
| | | | 706/20 |
| 12,099,542 B2* | 9/2024 | Severn | G06F 16/335 |

(Continued)

OTHER PUBLICATIONS

Bhambhoria, Rohan, Lei Chen, and Xiaodan Zhu. "A simple and effective framework for strict zero-shot hierarchical classification." arXiv preprint arXiv:2305.15282 (2023). (Year: 2023).*

(Continued)

*Primary Examiner* — Mohsen Almani

(74) *Attorney, Agent, or Firm* — SCHWEGMAN LUNDBERG & WOESSNER, P.A.

(57) ABSTRACT

A categorization method is provided. Training data is received that relates to assigning a first category to a first item using first item data. The first category is based on a first node and a first sub-node associated with the first node. A machine learning model is trained to categorize the first item using the first item data. Second item data associated with a second item is received. A second category is assigned to the second item with the second item data using a machine learning model trained with the training data. The second category is based on a second node and a second sub-node associated with the second node. Additional training data is iteratively received over time to train the machine learning model over time. The additional training data relates to assigning a third category to a third item using third item data associated with the third item.

20 Claims, 6 Drawing Sheets

(56) References Cited

U.S. PATENT DOCUMENTS

| | | | | |
|---|---|---|---|---|
| 2014/0207776 | A1* | 7/2014 | Harris | G06Q 10/10 |
| | | | | 707/737 |
| 2015/0066711 | A1* | 3/2015 | Chua | G06Q 30/00 |
| | | | | 705/28 |
| 2021/0216847 | A1* | 7/2021 | Ramani | G06Q 10/087 |
| 2022/0058504 | A1* | 2/2022 | Malhotra | G06N 7/01 |
| 2023/0143418 | A1* | 5/2023 | Raghunathan | G06F 40/205 |
| 2023/0316186 | A1* | 10/2023 | Miller | G06F 40/40 |
| | | | | 705/7.25 |
| 2023/0401385 | A1* | 12/2023 | Mehta | G06F 40/126 |
| 2024/0029132 | A1* | 1/2024 | Lin | G06N 3/042 |
| 2024/0265041 | A1* | 8/2024 | Rennie | G06F 16/3329 |
| 2024/0370476 | A1* | 11/2024 | Madisetti | G06F 16/3329 |
| 2025/0111418 | A1* | 4/2025 | Miller | G06Q 40/03 |
| 2025/0124484 | A1* | 4/2025 | Mesard | G06Q 30/0631 |
| 2025/0139137 | A1* | 5/2025 | Scheibelhut | G06F 16/335 |

OTHER PUBLICATIONS

Chistova, Elena. "Representation Learning for Hierarchical Classification of Entity Titles." Proceedings of the 6th International Conference on Natural Language and Speech Processing (ICNLSP 2023). 2023. (Year: 2023).*

Narushynska, Olga, et al. "Data sorting influence on short text manual labeling quality for hierarchical classification." Big Data and Cognitive Computing 8.4 (2024): 41. (Year: 2024).*

Zangari, Alessandro, et al. "Hierarchical text classification and its foundations: A review of current research." Electronics 13.7 (2024): 1199. (Year: 2024).*

Biswas, Anjanava, and Wrick Talukdar. "Robustness of structured data extraction from in-plane rotated documents using multi-modal large language models (LLM)." Journal of Artificial Intelligence Research (2024). (Year: 2024).*

Lee, Eunji, et al. "Explainable product classification for customs." ACM Transactions on Intelligent Systems and Technology 15.2 (2024): 1-24. (Year: 2024).*

Akritidis, Leonidas, et al. "A self-verifying clustering approach to unsupervised matching of product titles." Artificial Intelligence Review 53.7 (2020): 4777-4820. (Year: 2020).*

Radhakrishnan, Priya, Manish Gupta, and Vasudeva Varma. "Modeling the evolution of product entities." Proceedings of the 37th international ACM SIGIR conference on Research & development in information retrieval. 2014. (Year: 2014).*

Guglielmi et al., WO 2023/247730 A1, "System and Method of Optimizing Digital Catalogs for Online Marketplaces", 2022.*

Mohan et al., EP4250219 A1, "Bundle Creation From Description Content Using Machine Learning", 2022.*

"eBay Categories", [Online]. Retrieved from the Internet: https: developer.ebay.com api-docs user-guides static trading-user-guide categories.html, (2024), 3 pgs.

Fan, Jianping, "Hierarchical Learning of Tree Classifiers for Large-Scale Plant Species Identification", IEEE Transactions on Image Processing, (Jul. 2015), 13 pgs.

Mo, Kaichun, "PartNet A Large Scale Benchmark for Fine Grained and Hierarchical Part Level 3D Object Understanding", Computer Vision Foundation, (2019), 10 pgs.

Rousu, Johu, "Learning Hierarchical Multi Category Text Classification Models", Proceedings of the 22nd International Conference on Machine Learning, (2005), 8 pgs.

Shen, Dan, "Large Scale Item Categorization for e Commerce", Conference on Information and Knowledge Management, (Oct. 2012), 10 pgs.

* cited by examiner

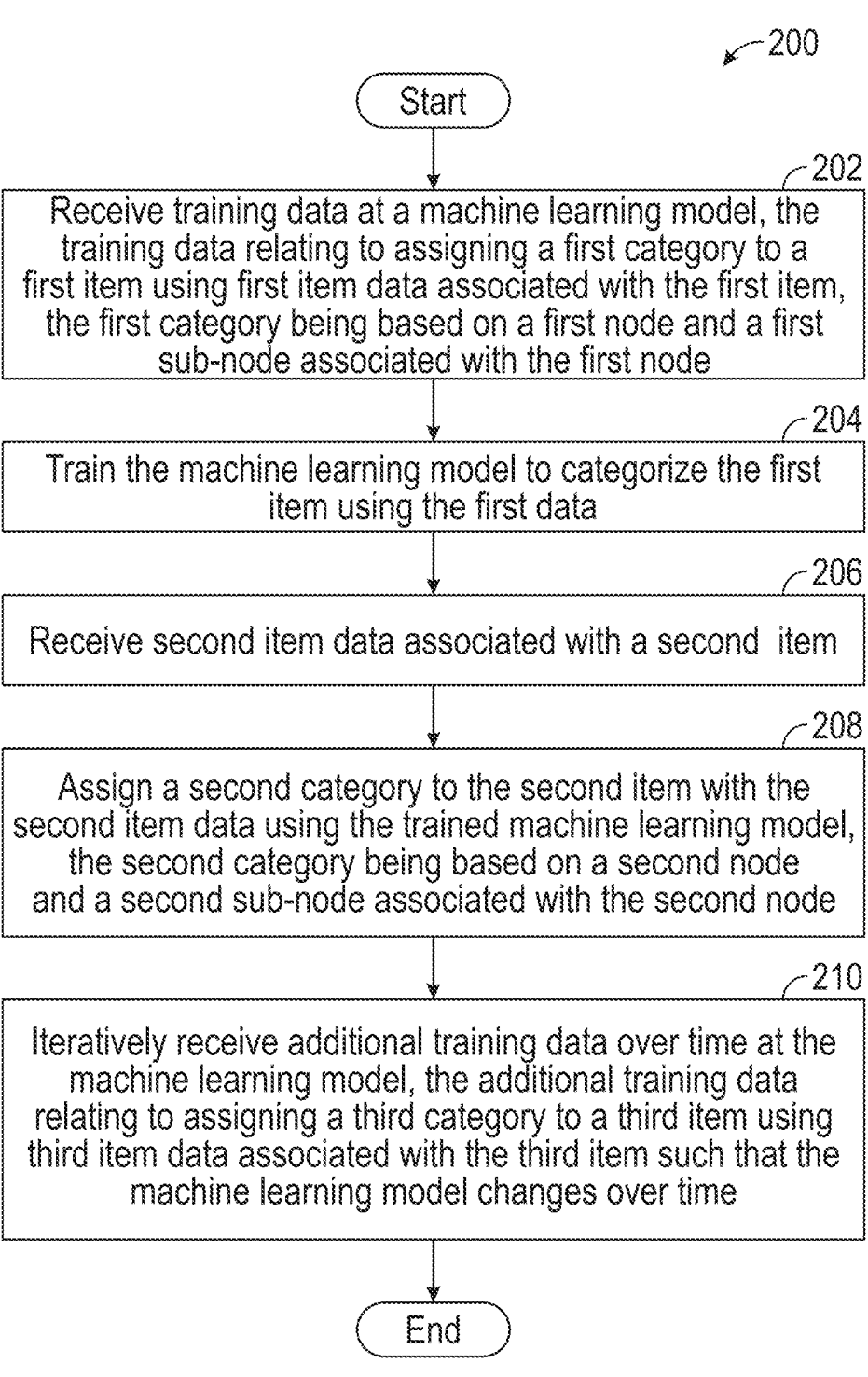

200

Start

202

Receive training data at a machine learning model, the training data relating to assigning a first category to a first item using first item data associated with the first item, the first category being based on a first node and a first sub-node associated with the first node

204

Train the machine learning model to categorize the first item using the first data

206

Receive second item data associated with a second item

208

Assign a second category to the second item with the second item data using the trained machine learning model, the second category being based on a second node and a second sub-node associated with the second node

210

Iteratively receive additional training data over time at the machine learning model, the additional training data relating to assigning a third category to a third item using third item data associated with the third item such that the machine learning model changes over time End

INFERRING RIGHT LEAF-CATEGORY FOR A PRODUCT USING LLM

The present application claims priority to Application No. 63/635,957 filed on Apr. 18, 2024, the contents of which are incorporated herein in their entirety.

BACKGROUND

When a first user desires to list an item on a platform that a second user may be interested in, the first item can be categorized based on data that is provided by the first user. The data can describe attributes of the item. Based on the item attributes, the item can be categorized and then made available. However, if the item is not properly categorized, the second user may not be made aware of the item.

To further illustrate, if the first user desires to list an item that are brake pads for a BMW™ and the data includes a description of the brake pads along with a price of the brake pads, a system may mischaracterize this item as a steering component for a BMW™. Thus, if the second user is searching for brake pads for a BMW™, the second user will not be made aware of the brake pads listed by the first user.

BRIEF DESCRIPTION OF THE DRAWINGS

Various ones of the appended drawings merely illustrate examples of the present disclosure and should not be considered as limiting its scope.

FIG. 2 is a method for categorizing an item based on data associated with the item, according to some examples.

DETAILED DESCRIPTION

Figure 1:
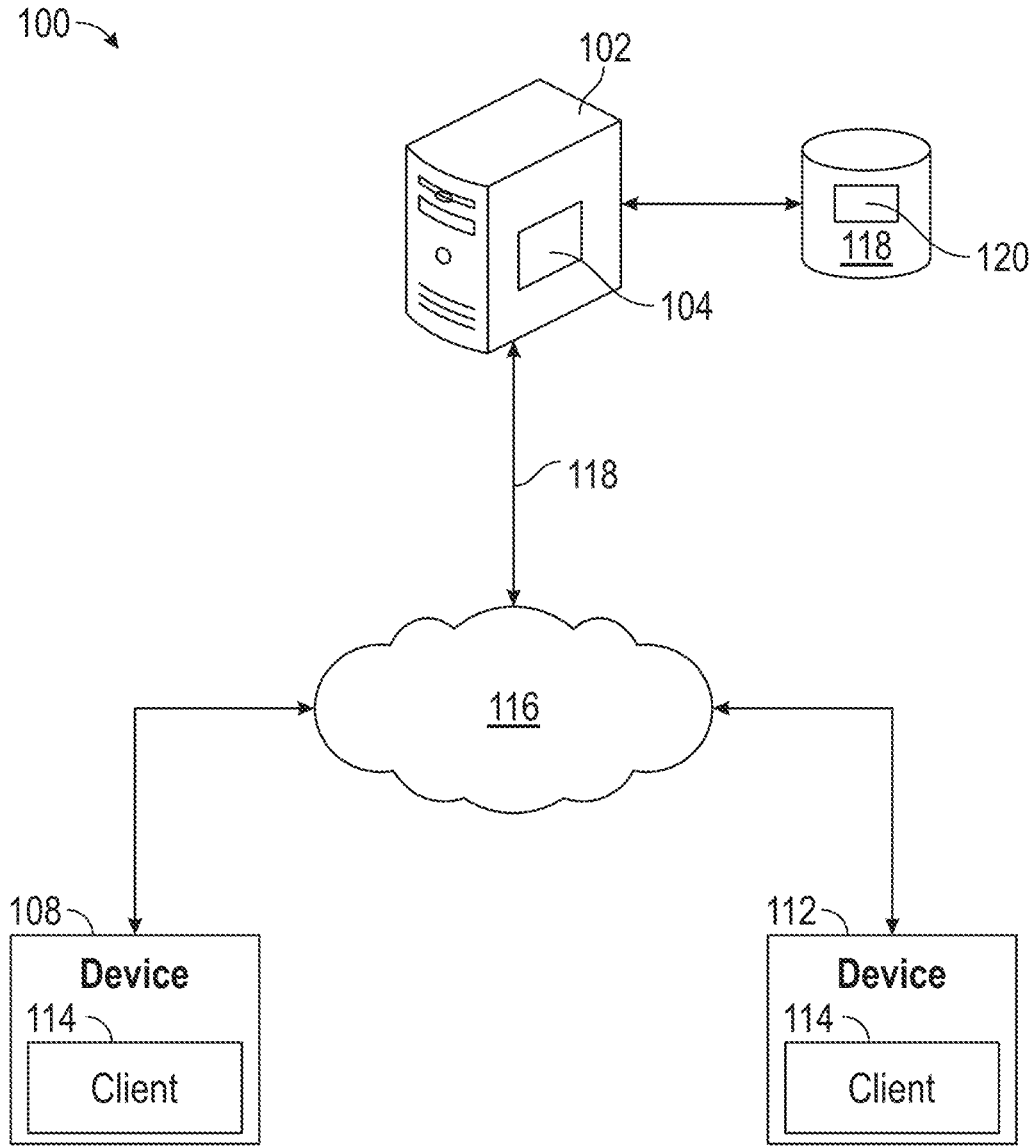
FIG. 1 is a network diagram illustrating a network environment suitable for categorizing an item based on data associated with the item, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples relate to using machine learning to categorize a first item based on data associated with the first item using a text classification approach. Training data can be provided to a machine learning model in order to train the machine learning model to categorize items using the first item data provided to the machine learning model. The machine learning model can be trained to identify tokens in the first item data having a key:value format. The key in the object can relate to an item type such as a subject and the value can relate to a descriptor of the subject, which can be a version of the item, such as a two-door vehicle or a four-door vehicle. The machine learning model can identify a plurality of keys and values associated with each of the keys.

Using the identified keys, the machine learning model can match the identified keys to first nodes in a first hierarchical nodal structure level. Using the identified values that are associated with each of the identified keys, the machine learning model can match the identified values to second nodes in a second hierarchical nodal structure level that is a sub-level to the first hierarchical level. The nodes can correlate to categories for second items similar to the first item. When the machine learning model matches values to the second nodes, the machine learning model can use the categories that correlate to the second node to categorize the first item.

The machine learning model can include a knowledge base having contextual datasets that can be accessed to categorize an item using the item data and identify keys. Training data can be provided to the machine learning model to train the machine learning model how to categorize an item based on the item data. The machine learning model can include any type of deep learning algorithm that can perform various natural language processing tasks, such as a large language model. Examples can include Chat Generative Pre-trained Transformer (ChatGPT), Mistral 7B, Phi-3, or the like. Further examples of machine learning models that can be used can include Classification And Regression Training, gradient boosted machines, glmnet, randomForest, SciPy, XGBoost, and various neural networks, such as a Feed-Forward neural network, a radial basis function neural network, a multilayer perceptron neural network, a convolutional neural network, a recurrent neural network, and a modular neural network.

The machine learning model can use deep learning to output text through transformer neural networks. The machine learning model can be provided ground rules and then be provided data, such as previous feedback provided from users. In an unsupervised format, the machine learning model can train to develop an understanding of the relationships objects in the item data having a key:value format and nodes in the hierarchical nodal structure. The machine learning model can include a LLM and more specifically an attention model. The training data can be tagged based on a desired categorization of the first item associated with an input, such as a title for the first item.

Now turning attention to the Figures, FIG. 1 is a network diagram illustrating a network environment 100 suitable for categorizing a first item based on data associated with the first item. The network environment 100 includes a server 102 having a machine learning model 104 along with devices 108 and 112 communicatively coupled to each other via a network 116. The devices 108 and 112 can interact with the server 102 using a web client or app client 114. The server 102 and the devices 108 and 112 may each be implemented in a computer system, in whole or in part, as described below with respect to FIGS. 5 and 6.

The server 102, which can be an e-commerce server, can include an electronic commerce application to other machines (e.g., the devices 108 and 112) via the network 116. The electronic commerce application can provide a way for users to buy and sell items directly to each other, to buy from and sell to the electronic commerce application provider, or both.

The network 116 may be any network that enables communication between or among machines, databases, and devices (e.g., the server 102 and the devices 108 and 112). Accordingly, the network 116 may be a wired network, a wireless network (e.g., a mobile or cellular network), or any suitable combination thereof. The network 116 may include one or more portions that constitute a private network, a public network (e.g., the Internet), or any suitable combination thereof.

The server 102 along with the machine learning model 104 can be operatively coupled to, and communicate with, a database 118 that can include a knowledge base having content 120. The machine learning model 104 can access the database 118 and the content 120 when the machine learning model 104 is categorizing an item based on item data. The database 118 can include data about various items, such electronic devices, motorized or non-motorized vehicles, appliances, household goods, or any type of item that can be exchanged between a first user and a second user.

To further illustrate, the content 120 can include data relating to Polaris™ Sportsman™ and Polaris™ Ranger™ vehicles. The content 120 can include characterization data such as each of the Polaris™ Sportsman™ vehicles and Polaris™ Ranger™ vehicles being utility vehicles (UTV) and all-terrain vehicles (ATV). Sticking with the Polaris™ illustration, the content 120 can also relate to various configurations of these UTV/ATVs, such as two-door, four-door, enclosed, and the like. In the Polaris™ illustration, the stored data can be contextual data, where the Polaris™ vehicles are UTV/ATVs having the features described above. The content 120 can be stored as datasets in the database 118.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 5 and 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

Now making reference to FIG. 2, a method 200 for categorizing an item based on data associated with the item is shown. Initially, during an operation 202, training data is received at a machine learning model. The training data can relate to an item and also include a category to which an item in the title has been assigned. The training data can relate to assigning a first category to a first item using first item data that is associated with the first item. The first item data can have a key:value pair structure where the key can be a subject and the value can be descriptor. The subject can relate a high-level description of the item, such as an electronic device, a motorized or non-motorized vehicle, appliances, household goods, or any type of item that can be exchanged between a first user and second user. The descriptor can describe the subject, such as a type or feature of an electronic device, a type or feature of a motorized or non-motorized vehicle, a type or feature of appliance, a type or feature of household good, or a type or feature of any type of item that can be exchanged between a first user and second user.

Figure 3:
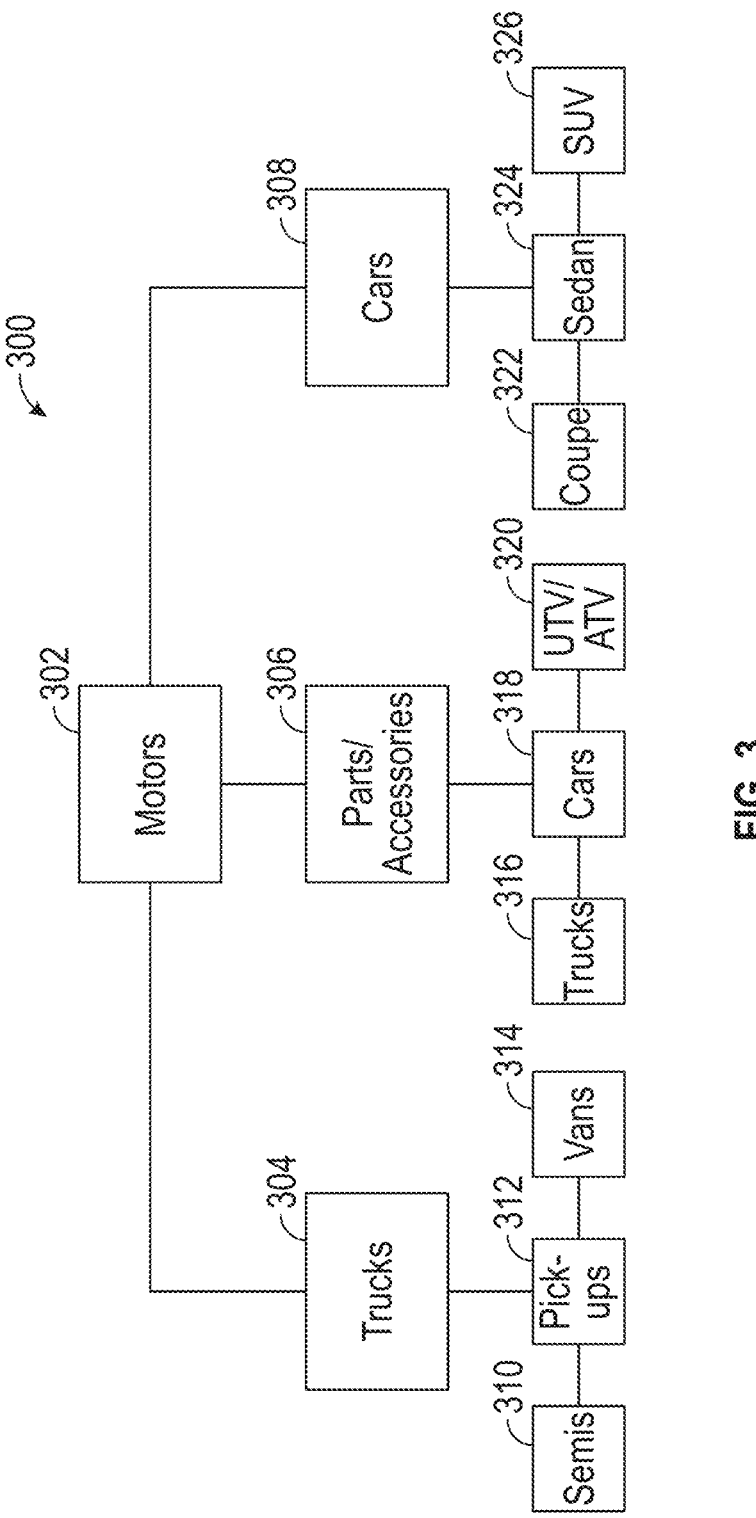
FIGS. 3 and 4 illustrate a hierarchical structure used by a machine learning model of FIG. 1 to categorize an item, according to some examples.
Figure 4:
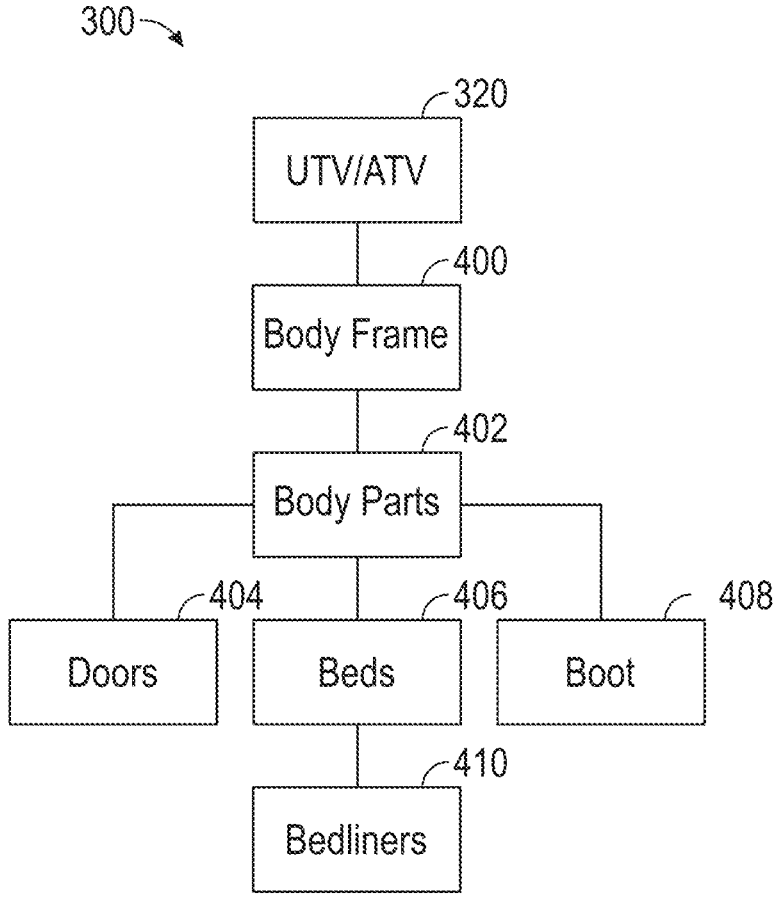

The training data can also indicate how the title should be categorized based on the key:value pairs within the title. More specifically, the category can be based on a first node and a first sub-node that is associated with the first node. The nodes can correlate to a hierarchical structure, which can be used by the machine learning model to categorize an item. As shown with reference to FIG. 3, a hierarchical structure 300 can include a first level node 302 where second level nodes 304-308, which can be first sub-nodes, are associated with the first level node 302. The first level node 302 can form a first level in the hierarchical structure 300 while second level nodes 304-308 can form a second level in the hierarchical structure 300. Each of the second level nodes 304-308 can have third level nodes associated therewith. Thus, third level nodes 310-314 can be associated with the second level node 304. Third level nodes 316-320 can be associated with the second level node 306. Moreover, third level nodes 322-326 can be associated with the second level node 308. Ones of the third level nodes 310-326 can have fourth level nodes associated therewith. Accordingly, a fourth level node 400 can be associated with the third level node 320. Moreover, a fifth level node 402 can be associated with the fourth level node 400 and sixth level nodes 404-408 can be associated with the fifth level node 402. A seventh level node 410 can be associated with the sixth level node 406.

The nodes 302-328 and 400-410 can be associated with different categorizations for an item where a higher node, such as the first level node 302 can correspond to a genus and each to the lower-level nodes can correspond to species and sub-species of the correspond upper-level nodes. The first level node 302 can correspond to a genus of motors while the second level node 306 can correspond to a species of the first level node 302 that relates to parts/accessories. The third level node 320 can be a subspecies of the second level node 306 that relates to a UTV/ATV while the fourth level node 400 can be a subspecies of the third level node 320 that relates to a body frame. The fifth level node 402 can be a subspecies of the fourth level node 400 that relates to body parts while the sixth level node 404 can be a subspecies of the fifth level node 402 that relates to doors.

Each of the nodes 304-326 can have a species/subspecies relationship to preceding nodes as discussed herein. The genus:species can correspond to the key:value pair where the genus can be the subject and the species can the descriptor. As such, motors in the first level node 302 can be the subject while the second level node 306 can be the descriptor. In this instance, the subject could be motors while the descriptor could be parts/accessories. Additionally, UTV/ATV in the third level node 320 could be the subject while the fourth level node 400 could be the descriptor. Thus, UTV/ATV in the third level node 302 could be the subject while body frame in the fourth level node 400 could be the descriptor.

Moreover, subjects and descriptors in key:value pairs are not limited to level nodes that are immediate parent/children, such as the first level node 302/second level node 306 and the third level node 320/fourth level node 400. Key:value pairs can skip intermediate subspecies. Accordingly, the sixth level node 404 could be a subspecies to the first level node 302 in the key:value pair motors: doors.

Using the identified key:value pair, the item can be categorized to enhance searching for the item by a buyer. In particular, if a buyer is searching for an item being sold by a seller and the buyer inputs search terms that relate to the genus or the species, an item being offered by the seller that is categorized using the hierarchical structure 300 can be presented to the buyer.

During an operation 204, the machine learning model can be trained to categorize the item using the item data. The machine learning model can be trained to parse the item data into tokens having key:value pairs. Moreover, during the operation 204, the machine learning model can be trained to identify related key:value pairs. To further illustrate, the key:value pairs can correspond to a genus:species pairs. Here, a first genus:species pair may have a first genus ($G_1$) and a first species ($S_1$). A second genus:species pair may have the first species $S_1$ as the second genus ($G_2$) and a second species ($S_2$). Accordingly, the first species $S_1$ can be a genus to the second species $S_2$. This can be referred to as a hierarchical structure relationship. The machine learning model can be trained to organize the identified the key:value according to hierarchical structure relationships. Thus, the key:value pairs can be organized as $G_1$:$S_1$, $S_1$:$S_2$, . . . $S_N$:$S_{N+1}$. Moreover, the machine learning model can be trained to search a hierarchical structure in an order of the organized of the key:value pairs. Thus, the machine learning model can be trained to search a hierarchical structure first according to $G_1$:$S_1$, then $S_1$:$S_2$, and then $S_N$:$S_{N+1}$.

In addition, during the operation 204, the machine learning model can be trained to access content accessible to the machine learning model and search the content using the key:value pairs parsed from the item data. The accessible content can be separate from the hierarchical structure. Any information pulled from the content can be used to search the hierarchical structure. Thus, if the item data includes a vehicle name, during the operation 204, the machine learning model can search the content and, if the vehicle name along with a vehicle type associated with the vehicle name, the machine learning model can be trained to search the hierarchical structure with the vehicle type.

As an example of the method 200 and referred to herein as "the example," the training data can include the title "A green Polaris™ Sportsman™ part having body part number 2889391-58." The training data can also include the categorization of "UTV/ATV doors." The machine learning model 104 can be trained to parse the title into a number of key:value pairs where a first key:value pair can be Polaris™ Sportsman™:body part and a second key:value pair can be body part:part number 2889391-58. In addition, the machine learning model 104 can be trained to organize the key:value pairs as Polaris™ Sportsman™:body part and body part:part number 2889391-58.

The machine learning model 104 can be trained to initially search the content 120 using the Polaris™ Sportsman™:body part and body part: part number 2889391-58. Moreover, the machine learning model 104 can be trained to search the hierarchical structure 300 using any information learned from the content 120. Here, the content 120 can indicate that the Polaris™ Sportsman™ correlates to a UTV/ATV. Using the information that the Polaris™ Sportsman™ correlates to a UTV/ATV, the machine learning model 104 can be trained to go to the third level node 320.

From the third level node 320, the machine learning model 104 can be trained to determine if any species nodes correlate to the descriptor associated with the subject Polaris™ Sportsman™, which in the example is body parts. In the example, the fifth level node 402 is associated with the third level node 320 via the fourth level node 400, which relates to a body frame. Therefore, the machine learning model 104 can be trained to skip intervening nodes in a hierarchical structure based on a correlation between a subject in a key:value and a descriptor in the key:value pair since the fifth level node 402 is associated with the third level node 320 via the fourth level node 400.

The machine learning model 104 can then be trained to correlate the fifth level node 402 with any of the sixth level nodes 404-408. In the example, the descriptor for the subject body part is part number 2889391-58. Here, the machine learning model 104 can be trained to learn that the part number 2889391-58 correlates to a door, which is the sixth level node 404. Therefore, the machine learning model 104 can be trained that when a title is received that includes the part number 2889391-58 and the name Polaris™ Sportsman™, this should be categorized as a door for a UTV/ATV.

Furthermore, the machine learning model 104 can be trained according to a pattern of the part number. In particular, various aspects of the part number 2889391-58 can relate to different identifying characteristics. To further illustrate, the number "288" can relate to a Polaris™ Sportsman™, the number "9391" can relate to a body part for a Polaris™ Sportsman™, and the number "5" after the number "9391" can relate to a door while the number "8" can relate a door side.

Returning to the method 200, after the machine learning model is trained in the operation 204, an operation 206 is performed where second item data associated with a second item is received. The second item data and the second item can have a structure that is either similar to, or different from, the first item data and the first item data.

Once the machine learning model receives the second item data associated with the second item, the method 200 performs an operation 208 where a second category can be assigned to the second item using the trained machine learning model. The second category can be assigned as discussed above, where the machine learning model can parse the second item data into key:value pairs, search a database for any content associated with subjects and descriptors of the key:value pairs, and search a hierarchical structure for nodes having the subjects and descriptors associated with the key:value pairs.

Returning to the example, during the operation 206, the machine learning model 104 receives the title "A desert sand Polaris™ Ranger™ part having a door body part number 2889850-85." The machine learning model 104 can parse the title into a first key:value pair Polaris™ Ranger™: body part, and a second key:value pair body part:door body part number 2889850-85 using the techniques described above. The machine learning model 104 can then search the database 118 and the content 120 for any information relating to a Polaris™ Ranger™ and part number 2889850-85.

In the example, the machine learning model 104 can learn that the Polaris™ Ranger™ relates to a UTV/ATV by searching the content 120. Therefore, the machine learning model 104 searches the hierarchical structure 300 for the third level node 320 that correlates to a UTV/ATV. The machine learning model 300 then searches the hierarchical structure 300 for a node that correlates to the fifth level node 402 and is a species of the third level node 320 as discussed above with reference to the operation 204.

The machine learning model 104 can also search for a node in the hierarchical structure 300 that correlates to the descriptor "door." Here, the sixth level node 404 corresponds to the descriptor "door." Based on the third level node 320 and the sixth level node 404, the machine learning model 104 can assign the category UTV/ATV door to the title "A desert sand Polaris™ Ranger™ part having a door body part number 2889850-85."

The machine learning model can also be fine-tuned during an iterative training process over time where the machine learning model receives additional training data relating to assigning a third category to a third item during an operation 210. The machine learning model can assign a category to the third item using third item data associated with the third item. Thus, the machine learning model can change over time.

The machine learning model can be fine-tuned to determine different types of key:value pairs within item data. This can include distinguishing when item data that is a single word includes both a subject and a descriptor. During the operation 210, the machine learning model can be trained to recognize this type of item data structure and create a key:value pair using this item data structure. While recognizing a different type of item data structure can be used to change the machine learning model over time, the machine learning model can be updated with any type of change during the operation 210 where the changes can be based on different desired categorization outputs.

Returning to the example, during the operation 210, the machine learning model 104 can be provided training data that includes the title "bedliner for a Polaris™ UTV that seats four and has a roof." The training data can also include the categorization associated with this training data that can be a bedliner for a bed of a Polaris™ Ranger™. The machine learning model 104 can be trained to parse the title into key:value pairs having the following order: a first key:value pair of Polaris™:four seater, a second key:value pair of four seater:roof, and a third key:value pair of four seater:bedliner.

Moreover, the machine learning model 104 can be trained to determine that the data item bedliner is a key:value pair where the subject is a bed and the descriptor is a liner. Therefore, a fourth key:value pair can be bed:liner. During the operation 210, the machine learning model 104 can be fine-tuned to determine that a single data item, such as bedliner, is in fact a key:value pair that includes bed as the subject and liner as the descriptor.

Searching the content 120, the machine learning model 104 can determine that Polaris™ Ranger™ relates to the UTV/ATV third level node 320 in the hierarchical structure 300. The machine learning model 104 can also search the hierarchical structure 300 for nodes that include a bed and a bedliner. In the example, the machine learning model 104 determines that the sixth level node 406 has the term bed and the seventh level node 410 has the term bedliner. The machine learning model 104 also determines that the sixth level node 406 is a species of the third level node 320 and that the seventh level node 410 is a subspecies of the sixth level node 406. Therefore, the machine learning model 104 can assign a third category relating to an UTV/ATV bedliner based on being fine-tuned to recognize a different type of an item data structure.

The machine learning model can be trained to classify an item based on summarization. The machine learning model can be trained to parse a title and determine a pattern within the title. The machine learning model can also be trained to infer data based on the pattern of objects within the title. A pattern of the title can be matched against patterns for which the machine learning model has been previously trained. Moreover, in this scenario, the title may include data to which the machine learning model has not been exposed.

To illustrate the concepts associated with parsing a title and determining a pattern within the title, the machine learning model may have trained at time $t_1$ to recognize patterns within a time $t_1$ title, such as "Apple iPhone™ 15 ProMax." The title may include a time $t_1$ version number of an item within the title, such as 15. At a time $t_2$, a title, such as "Apple iPhone™ 16 ProMax," can be provided to the machine learning model that can include a newer, $t_2$ version, which can be "16.". However, the machine learning model may not have been trained with the $t_2$ version. Nonetheless, the machine learning model can be trained to learn that a pattern, such as after the term "Apple iPhone™" and before the term "ProMax," a version number is typically provided. Thus, the machine learning model can be trained and fine-tuned to determine the company, which is Apple, the product line, which is iPhone™, and the version, which is version 16. The machine learning model can learn, through real world content, that a next version having a next higher number, is released within a certain time frame that includes time $t_2$. Armed with this data, the machine learning model can perform a proper categorization.

Figure 5:
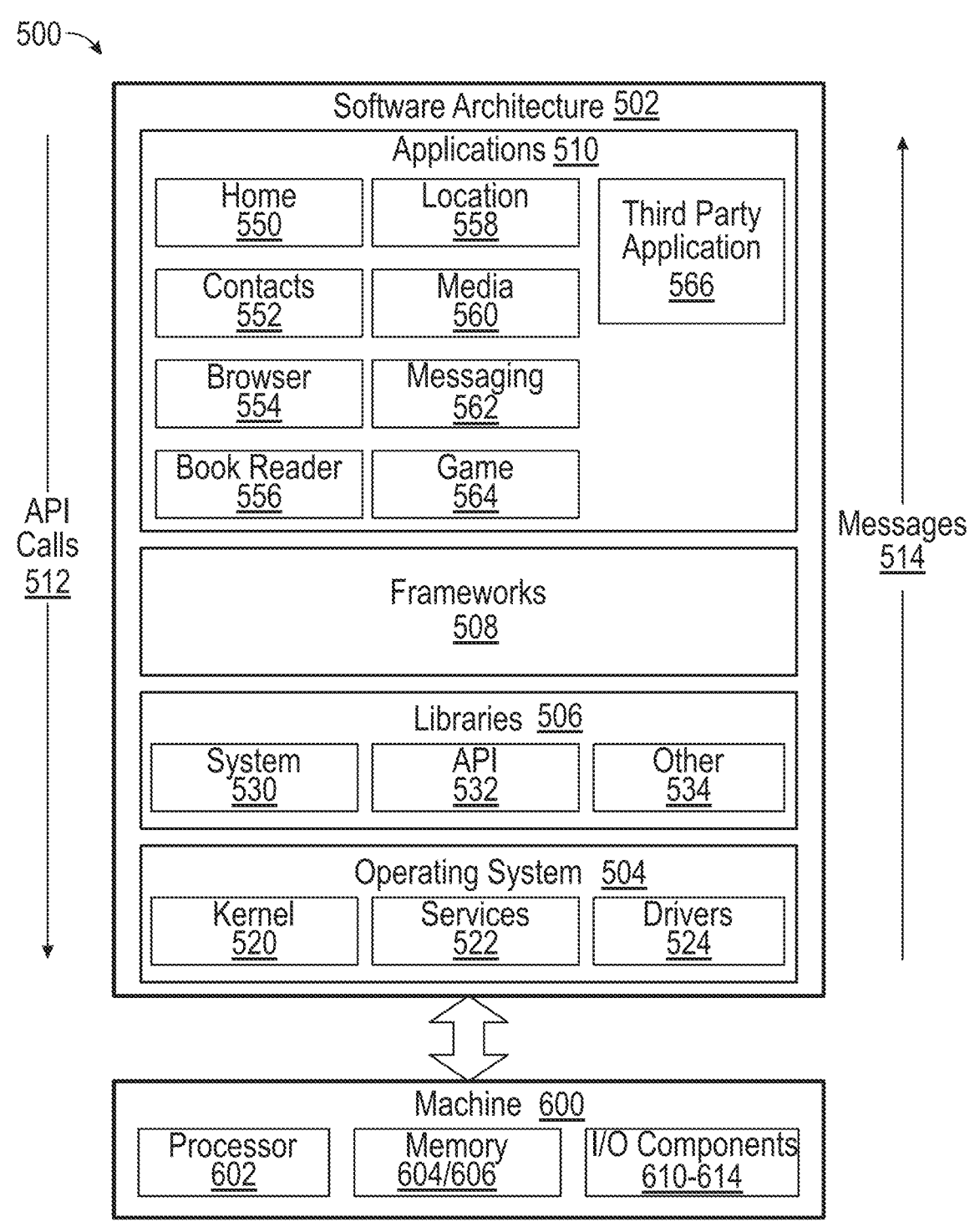
FIG. 5 is a block diagram illustrating architecture of software used to implement social network-initiated listings, according to some examples.
Figure 6:
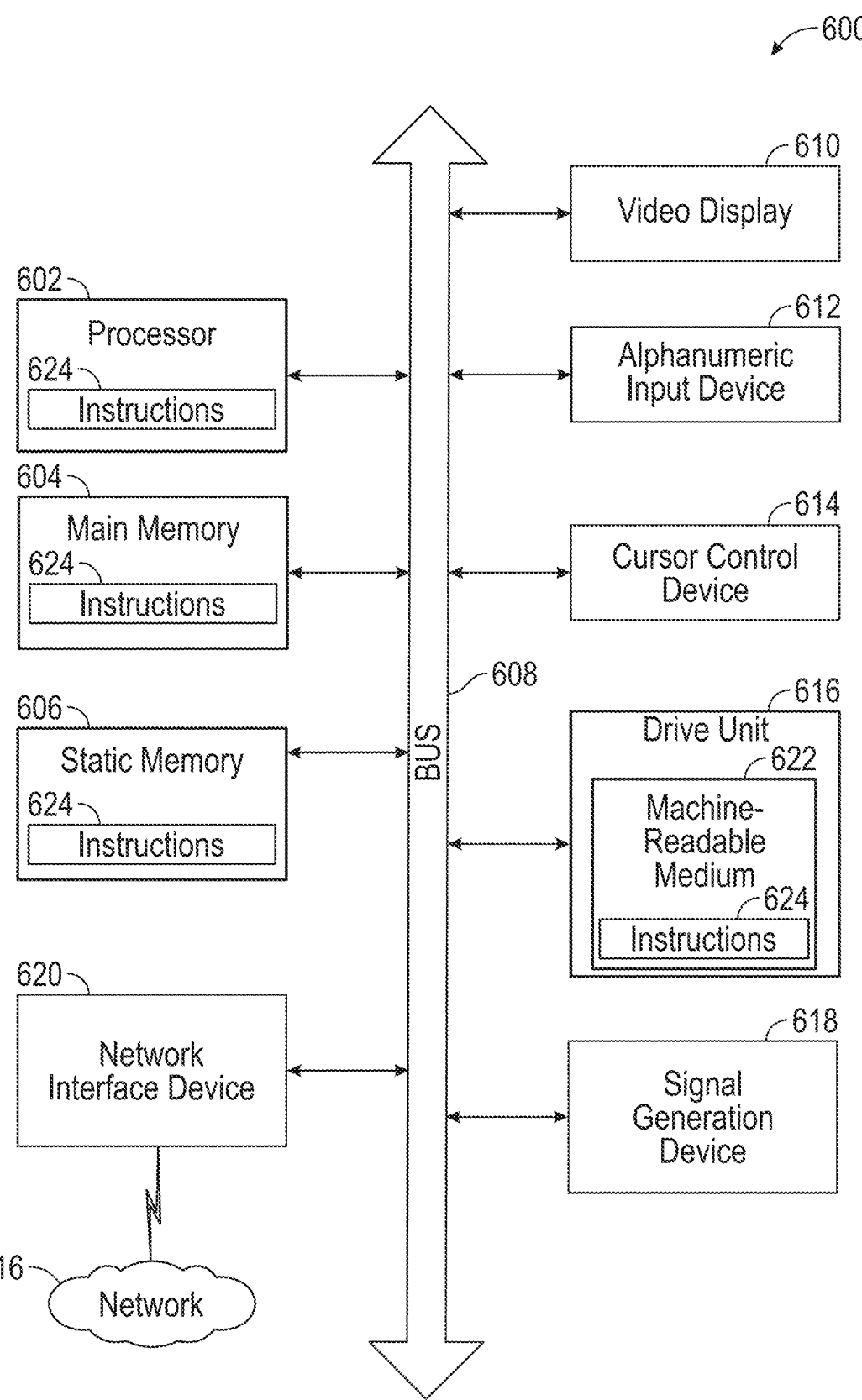
FIG. 6 shows a machine as an example computer system with instructions to cause the machine to implement social network-initiated listings, according to some examples.

FIG. 5 is a block diagram 500 illustrating a software architecture 502, which may be installed on any one or more of the devices described above. FIG. 6 is merely a non-limiting example of a software architecture, and it will be appreciated that many other architectures may be implemented to facilitate the functionality described herein. The software architecture 502 may be implemented by hardware such as a machine 600 of FIG. 6 that includes a processor 602, memory 604 and 606, and I/O components 610-614. In this example, the software architecture 502 may be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, according to some implementations.

In various implementations, the operating system 504 manages hardware resources and provides common services. The operating system 504 includes, for example, a kernel 520, services 522, and drivers 524. The kernel 520 acts as an abstraction layer between the hardware and the other software layers in some implementations. For example, the kernel 520 provides memory management, processor management (e.g., scheduling), component management, networking, and security settings, among other functionality. The services 522 may provide other common services for the other software layers. The drivers 524 may be responsible for controlling or interfacing with the underlying hardware. For instance, the drivers 524 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 506 provide a low-level common infrastructure that may be utilized by the applications 510. The libraries 506 may include system libraries 530 (e.g., C standard library) that may provide functions such as memory allocation functions, string manipulation functions, mathematic functions, and the like. In addition, the libraries 506 may include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 may also include a wide variety of other libraries 534 to provide many other APIs to the applications 510.

The frameworks 508 provide a high-level common infrastructure that may be utilized by the applications 510, according to some implementations. For example, the frameworks 508 provide various graphic user interface (GUI) functions, high-level resource management, high-level location services, and so forth. The frameworks 508 may provide a broad spectrum of other APIs that may be utilized by the applications 510, some of which may be specific to a particular operating system or platform.

In an example, the applications 510 include a home application 550, a contacts application 552, a browser application 554, a book reader application 556, a location application 558, a media application 560, a messaging application 562, a game application 564, and a broad assortment of other applications such as a third-party application 566. According to some examples, the applications 510 are programs that execute functions defined in the programs. Various programming languages may be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 566 may invoke the API calls 512 provided by the mobile operating system (e.g., the operating system 504) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 108 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

FIG. 6 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device (cursor control device) 1614 (e.g., a mouse), a disk drive unit 616, a signal generation device 618 (e.g., a speaker) and a network interface device 620.

The drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. Instructions 624 may also reside within the static memory 606.

While the machine-readable medium 622 is shown in an example to be a single medium, the term "machine-readable medium" may include a single medium or multiple media (e.g., a centralized or distributed database, and/or associated caches and servers) that store the one or more instructions or data instructions 624. The term "machine-readable medium" shall also be taken to include any tangible medium that is capable of storing, encoding or carrying instructions 624 for execution by the machine and that cause the machine to perform any one or more of the methodologies of the present invention, or that is capable of storing, encoding or carrying data structures utilized by or associated with such instructions 624. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 624 may further be transmitted or received over the network 116 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 624 for execution by the machine, and includes digital or analog communications signals or other intangible media to facilitate communication of such software.

In various example examples, one or more portions of the network 116 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 116 or a portion of the network 116 may include a wireless or cellular network, and the coupling 682 may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," "device-readable medium," and "machine storage medium," mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense. It will be understood that changes and modifications may be made to the disclosed embodiments without departing from the scope of the present disclosure. These and other changes or modifications are intended to be included within the scope of the present disclosure.

What is claimed is:

1. A method, comprising:

parsing training data by a machine learning model, the training data comprising assignments of first items to categories, the categories being organized in a hierarchical structure with nodes and sub-nodes under the nodes, a result of the parsing comprising at least one key:value pair for each item where a key is a subject and a value is a descriptor of the item;

training the machine learning model, based on the training data and the key:value pairs, to categorize items;

receiving a search request that includes a second item;

assigning, by the machine learning model, a second key-value pair to the second item;

assigning a second category to the second item, using the trained machine learning model, based on the search request and the second key-value pair, the second category corresponding to a second node and a second sub-node of the second node;

identifying items by the machine learning model based on the second key-value pair and the second category; and returning a search result including the items.

2. The method of claim 1, wherein the second node and the second sub-node are part of a hierarchical structure where the second node is at a hierarchical level that is above a hierarchical level of the second sub-node and additional second sub-nodes are associated with the second sub-node hierarchical level.

3. The method of claim 1, wherein the machine learning model is associated with a knowledge base having a plurality of datasets, wherein assigning the second category further comprises:

retrieving contextual data from a dataset of the plurality of datasets based on the subject of the second item and the descriptor of the second item; and assigning the second category to the second item based on the contextual data.

4. The method of claim 3, wherein the search request comprises a title of the second item, a key of the second key-value pair is a type of the second item, and a value of the second key-value pair is a version of the second item.

5. The method of claim 3, wherein the machine learning model is a large language model that parses the second item into a token having the key:value pair.

6. The method of claim 3, wherein the subject is a product specification of the second item and the descriptor is one of a part number, a brand, or a type and the second category is based on one of the part number, the brand, or the type.

7. The method of claim 1, further comprising training the machine learning model to infer data based on a pattern of objects within any type of item data.

8. A non-transitory machine-readable medium having instructions embodied thereon, the instructions executable by a processor of a machine to perform operations comprising:

parsing training data by a machine learning model, the training data comprising assignments of first items to categories, the categories being organized in a hierarchical structure with nodes and sub-nodes under the nodes, a result of the parsing comprising at least one key value pair for each item where a key is a subject and a value is a descriptor of the item;

training the machine learning model, based on the training data and the key:value pairs, to categorize items;

receiving a search request that includes a second item;

assigning, by the machine learning model, a second key-value pair to the second item;

assigning a second category to the second item, using the trained machine learning model, based on the search request and the second key-value pair, the second category corresponding to a second node and a second sub-node of the second node;

identifying items by the machine learning model based on the second key-value pair and the second category; and returning a search result including the items.

9. The non-transitory machine-readable medium of claim 8, wherein the second node and the second sub-node are part of a hierarchical structure where the second node is at a hierarchical level that is above a hierarchical level of the second sub-node and additional second sub-nodes are associated with the second sub-node hierarchical level.

10. The non-transitory machine-readable medium of claim 8, wherein the machine learning model is associated with a knowledge base having a plurality of datasets, assigning the second category further comprises:

retrieving contextual data from a dataset of the plurality of datasets based on the subject of the second item and the descriptor of the second item; and assigning the second category to the second item based on the contextual data.

11. The non-transitory machine-readable medium of claim 10, wherein the search request comprises a title of the second item, a key of the second key-value pair is a type of the second item, and a value of the second key-value pair is a version of the second item.

12. The non-transitory machine-readable medium of claim 10, wherein the machine learning model is a large language model that parses the second item into a token having the key:value pair.

13. The non-transitory machine-readable medium of claim 10, wherein the subject is a product specification of the second item and the descriptor is one of a part number, a brand, or a type and the second category is based on one of the part number, the brand, or the type.

14. The non-transitory machine-readable medium of claim 8, the operations further comprising training the machine learning model to infer data based on a pattern of objects within any type of item data.

15. A device, comprising:

a processor; and memory including instructions that, when executed by the processor, cause the device to perform operations including:

parsing training data by a machine learning model, the training data comprising assignments of first items to categories categories being organized in a hierarchical structure with nodes and sub-nodes under the nodes, a result of the parsing comprising at least one key:value pair for each item where a key is a subject and a value is a descriptor of the item;

training the machine learning model, based on the training data and the key:value pairs, to categorize items;

receiving a search request that includes a second item;

assigning, by the machine learning model, a second key-value pair to the second item;

assigning a second category to the second item, using the trained machine learning model, based on the search request and the second key-value pair, the second category corresponding to a second node and a second sub-node of the second node;

identifying items by the machine learning model based on the second key-value pair and the second category; and returning a search result including the items.

16. The device of claim 15, wherein the second node and the second sub-node are part of a hierarchical structure where the second node is at a hierarchical level that is above a hierarchical level of the second sub-node and additional second sub-nodes are associated with the second sub-node hierarchical level.

17. The device of claim 15, wherein the machine learning model is associated with a knowledge base having a plurality of datasets, assigning the second category further comprises:

retrieving contextual data from a dataset of the plurality of datasets based on the subject of the second item and the descriptor of the second item; and assigning the second category to the second item based on the contextual data.

18. The device of claim 17, wherein the search request comprises a title of the second item, a key of the second key-value pair is a type of the second item, and a value of the second key-value pair is a version of the second item.

19. The device of claim 17, wherein the machine learning model is a large language model that parses the second item into a token having the key:value pair.

20. The device of claim 17, wherein the subject is a product specification of the second item and the descriptor is one of a part number, a brand, or a type and the second category is based on one of the part number, the brand, or the type.

\* \* \* \* \*